United States Patent
Silny

(10) Patent No.: US 8,553,225 B2
(45) Date of Patent: Oct. 8, 2013

(54) BANDWIDTH TUNABLE SPECTROSCOPIC DEVICE

(75) Inventor: John F. Silny, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 349 days.

(21) Appl. No.: 12/846,319

(22) Filed: Jul. 29, 2010

(65) Prior Publication Data

US 2012/0026496 A1    Feb. 2, 2012

(51) Int. Cl.
*G01J 3/18*    (2006.01)

(52) U.S. Cl.
USPC ............................ 356/328; 356/317; 356/318

(58) Field of Classification Search
USPC .... 356/317, 318, 326, 328, 301; 250/339.11, 250/339.12, 458.1, 216, 227.18
See application file for complete search history.

(56) References Cited

U.S. PATENT DOCUMENTS

| | | | |
|---|---|---|---|
| 4,964,701 A | 10/1990 | Dorschner et al. | |
| 5,093,747 A | 3/1992 | Dorschner | |
| 5,126,869 A | 6/1992 | Lipchak et al. | |
| 5,317,379 A * | 5/1994 | Ryan et al. | 356/308 |
| 6,031,233 A * | 2/2000 | Levin et al. | 250/339.11 |
| 6,485,150 B1 * | 11/2002 | Driggers et al. | 359/615 |
| 6,686,583 B2 * | 2/2004 | Engelhardt | 250/216 |
| 7,142,735 B2 * | 11/2006 | Kump | 385/7 |
| 7,570,358 B2 * | 8/2009 | Den Boef | 356/326 |
| 7,733,484 B1 * | 6/2010 | Gupta et al. | 356/326 |
| 2001/0052979 A1 | 12/2001 | Treado | |
| 2010/0185067 A1 | 7/2010 | Gupta | |

OTHER PUBLICATIONS

Extended European Search Report dated Aug. 2, 2011 of European Appln. No. 11168009.6 filed May 29, 2011 (7 pages).

* cited by examiner

*Primary Examiner* — Sang Nguyen
(74) *Attorney, Agent, or Firm* — Lando & Anastasi, LLP

(57) ABSTRACT

An electromagnetic radiation detection device is described which includes a tunable dispersive optical element configured to receive electromagnetic radiation and to change the dispersion of the received electromagnetic radiation; a sensor configured to detect the dispersed electromagnetic radiation changed by the dispersive optical element; and a controller configured to: (i) selectively tune the dispersive optical element so as to adjust the dispersion of the received electromagnetic radiation; and (ii) change one or more of operating parameters of the sensor in accordance with the adjusted dispersion. In some implementations, the radiation detection device may be configured as a spectrometer to measure one or more properties of electromagnetic radiation. A method for detecting electromagnetic radiation is also disclosed.

16 Claims, 2 Drawing Sheets

BANDWIDTH TUNABLE SPECTROSCOPIC DEVICE

BACKGROUND

This application generally relates to measuring electromagnetic radiation (light), and in particular, to a bandwidth tunable spectroscopic device.

Conventional approaches to collecting spectral and hyperspectral data include, for example, using (1) multiple sensors having different desired bandwidths, (2) a single sensor with a mechanically rotated optical element (e.g. dispersive element or a fold mirror) to switch between a few selectable dispersive states, or (3) a single hyperspectral sensor to synthesize lower spectral resolution channels via spectral binning. These approaches, however, have limitations requiring redundant hardware, mechanically actuated optical elements, or high frame and data rates (with a corresponding reduction in radiometric performance) to achieve larger area coverage rates.

Thus, an improved electromagnetic radiation detection device is desired which overcomes the aforementioned drawbacks.

SUMMARY

In an embodiment, an electromagnetic radiation detection device comprises: a tunable dispersive optical element configured to receive electromagnetic radiation and to change the dispersion of the received electromagnetic radiation; a sensor configured to detect the dispersed electromagnetic radiation changed by the dispersive optical element; and a controller configured to: (i) selectively tune the dispersive optical element so as to adjust the dispersion of the received electromagnetic radiation; and (ii) change one or more of operating parameters of the sensor in accordance with the adjusted dispersion.

In another embodiment, a method for detecting electromagnetic radiation, comprises: detecting, with a sensor, dispersed electromagnetic radiation changed by a tunable dispersive optical element configured to receive electromagnetic radiation and to change the dispersion of the received electromagnetic radiation; adjusting the dispersive optical element so as to adjust the dispersion of the received electromagnetic radiation; and changing one or more of operating parameters of the sensor in accordance with the adjusted dispersion.

These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not a limitation of the invention. In addition, it should be appreciated that structural features illustrated or described in any one embodiment herein can be used in other embodiments as well.

BRIEF DESCRIPTION OF THE DRAWINGS

FIGS. 2 and 3 illustrate partial views of another exemplary bandwidth tunable electromagnetic radiation detection device having a reflective tunable dispersive optical element in two different configurations, in accordance with an embodiment, where

DETAILED DESCRIPTION

According to one or more embodiments, an electromagnetic radiation detection device is described which includes a tunable dispersive optical element configured to receive electromagnetic radiation and to change the dispersion of the received electromagnetic radiation; a sensor configured to detect the dispersed electromagnetic radiation changed by the dispersive optical element; and a controller configured to: (i) selectively tune the dispersive optical element so as to adjust the dispersion of the received electromagnetic radiation; and (ii) change one or more of operating parameters of the sensor in accordance with the adjusted dispersion.

The sensor configuration, in conjunction with tunable dispersive optical element of the device, provides a spectral bandwidth tunable capability. For instance, as the dispersion is increased, the spectral bandwidth decreases, providing higher spectral resolution and requiring longer integration periods to prevent starvation of the sensor. And, as the dispersion is decreased, the spectral bandwidth increases, providing lower spectral resolution and requiring shorter integration periods to prevent saturation of the sensor.

The controller may be configured to adjust the tunable dispersive optical element and the sensor's operating conditions (e.g., frame rate, integration period, and channel window subset) so as to provide a near continuous range of operating configurations that balance spectral resolution, spatial coverage, and radiometric (energy) sensitivity.

In some embodiments, the electromagnetic radiation detection device may be configured as a spectrometer or other spectroscopic device that is configured to measure properties of light over a specific portion of the electromagnetic spectrum and at different wavelengths thereof. This may enable hyperspectral imaging to detect electromagnetic radiation (light) over multiple discrete spectral bands and/or spectra, for example, in the infrared (IR), visible (VIS), and/or ultraviolet (UV) spectra. For instance, the spectrometer may be configured for spectral-selective imaging which detects one or more specific wavelengths of electromagnetic radiation (light). One such application that the spectrometer may be used for performing spectroscopic analysis to identify materials.

The electromagnetic radiation detection device can selectively enable the collection hyperspectral data at various spectral bandwidths, and thus, providing (i) lower spectral resolutions having higher area rate coverage, and (ii) higher spectral resolution with lower area rate coverage. For one exemplary tunable dispersive optical element, the range of spectral bandwidths may range from about 5 to 100 nm. Of course, other tunable dispersive optical elements may have different characteristics.

Figure 1:
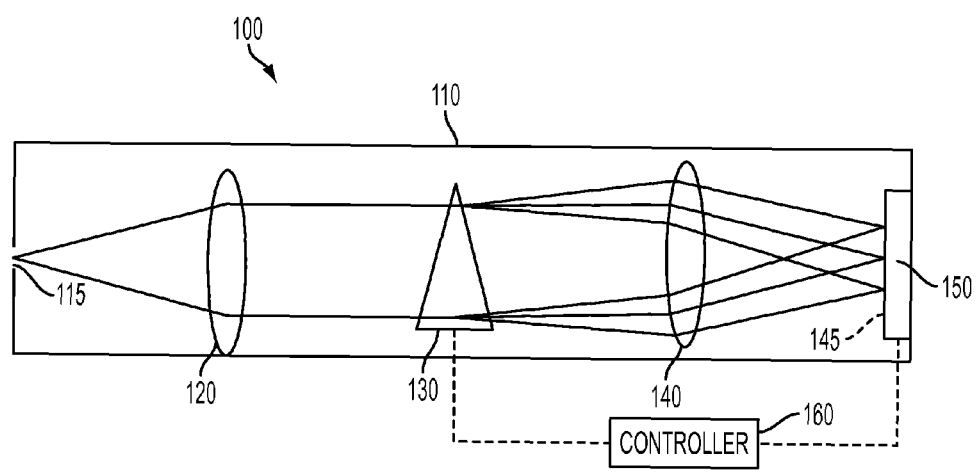
FIG. 1 illustrates a schematic of an exemplary bandwidth tunable electromagnetic radiation detection device having a transmissive tunable dispersive optical element, in accordance with an embodiment.

FIG. 1 illustrates a schematic of exemplary bandwidth tunable electromagnetic radiation detection device 100 having a reflective tunable dispersive optical element, in accordance with an embodiment.

Device 100 generally includes housing 110, collimator 120, tunable dispersive optical element 130, imager 140, electromagnetic radiation detector sensor 150, and controller 160.

Housing 110 may incorporate the various elements of device 100 and protects the elements from excessive/ambient light, the environment (e.g., moisture, dust, etc.), mechanical damage (e.g., vibration, shock, etc). In addition, housing 110 is generally impervious to electromagnetic radiation, which may include light in the infrared IR, VIS, and/or UV spectra. Aperture 115 in housing 110 is an opening that allows electromagnetic radiation to enter imaging device 100. In one implementation, aperture 115 may be a slit so as to configure device 100 as an imager (i.e., to detect an image). In another embodiment, aperture 115 can be a so-called "pin-hole" aperture so as to configure device 100 as a non-imager.

Collimator 120 receives electromagnetic radiation entering aperture 115 and collimates the received electromagnetic radiation onto tunable dispersive optical element 130. In one implementation, collimator 120 may include an objective lens.

Tunable dispersive optical element 130 may include, for example, an optical phased array (OPA); a microelectromechanical system (MEMS); or a tunable liquid crystal (LC) filter, which are configured to selectively adjust the dispersion of received electromagnetic radiation via controller 160. Exemplary OPAs that may be used may include those described in U.S. Pat. Nos. 5,126,869; 5,093,747 and 4,964,701, herein incorporated by reference in their entireties.

In one implementation, tunable dispersive optical element 130 may be configured as an adjustable grating element whose period (i.e., line density) can be electronically controlled to tune the dispersion thereof. While tunable dispersive optical element 130 illustrated in FIG. 1 is shown to be transmissive, it will be appreciated that tunable dispersive optical element 130 may be include transmissive or reflective elements.

Imager 140 focuses the dispersed electromagnetic radiation changed by tunable dispersive optical element 130 onto focal plane 145, where sensor 150 is positioned. In one implementation, imager 140 may include an objective lens.

Electromagnetic radiation detector sensor 150 may include any two-dimensional (2-D) sensor or radiometer that is configured to detect electromagnetic radiation (light) corresponding to the entering light of interest. Exemplary electromagnetic radiation detector sensors may include complementary meta-oxide-semiconductor (CMOS), charge-coupled device (CCD), or other detectors having sufficient spectral response to detect electromagnetic radiation (light) of interest, for example, in the infrared IR, VIS, and/or UV spectra. In one implementation, sensor 150 may be a focal plane array (FPA) sensor.

Output from sensor 150 may be displayed on any display device (not shown). Exemplary displays may include a cathode ray tube (CRT), plasma, liquid crystal display (LCD), light emitting diode (LED) display, pen chart, etc. In some instances, output of sensor 150 may, alternatively or additionally, be printed by a printing device and/or stored in an electronic memory (not shown). Additional image processing may be further performed on the output signal (or image), if so desired, such as, for example, noise filtering, cropping, resizing, color-coordination, annotation, etc.

One or more parameters of sensor 150 may be adjusted via controller 160. For example, the signal output of sensor 150 may be proportional to the integration period. The integration period of sensor 150 is the time frame for that sensor to receive photons to generate an output signal. It may be selectively adjusted, for instance, over the range from about 1 to 20 ms. For some sensors, the integration period adjustment may correspond to an adjustment of the frame rate over the range from about 50 to 1,000 frames per second (fps). For other sensors, the frame rate may be separately controlled from the integration period (although, the faster the frame rate, the lesser the potential integration time for the sensor can be).

Each frame of data output may refresh the sensor's sampling (e.g., via biasing of the sensor). In some cases, sensor 150 may also include multiple pixel channels which are configured for various wavelengths and/or spectral bands. The signal output of sensor 150 may be proportional to the channel spacing (spatial bandwidth). As such, one or more channels may be selected so as to more efficiently (or perhaps, more optimally) detect the dispersed electromagnetic radiation.

Controller 160 is operably connected to tunable dispersive optical element 130 and sensor 150 and is configured to: (i) control dispersive optical element 130 so as to selectively adjust the dispersion of the received electromagnetic radiation; and (ii) change one or more of operating parameters of sensor 150 in accordance with the adjusted dispersion. Although controller 160 is depicted outside housing 110, in some implementations, controller 160 may be located inside housing 110.

In one or more embodiments, controller 160 may be configured to change/adjust one or more of: (i) the frame rate of sensor 150; (ii) the integration period of sensor 150; or (iii) the channels of sensor 150, so as to substantially maintain the same radiometric (energy) sensitivity of sensor 150 to the received electromagnetic radiation for various adjusted dispersions.

For example, there may be an inverse, but linear, relationship between the dispersion, and the spectral bandwidth, of the dispersed electromagnetic radiation. Thus, if the dispersion is increased, the spectral bandwidth will decrease, providing higher spectral resolution and requiring longer integration periods to prevent starvation of sensor 150. On the other hand, if the dispersion is decreased, the spectral bandwidth will increase, providing lower spectral resolution and requiring shorter integration periods to prevent saturation of sensor 150. This is illustrated in more detail in FIGS. 2-3.

Controller 160 may include hardware, such as Application Specific Integrated Circuits (ASICs), Field Programmable Gate Arrays (FPGAs), digital signal processors (DSPs), or other integrated formats. However, those skilled in the art will recognize that controller 160 may, in whole or in part, can be equivalently implemented in integrated circuits, as one or more computer programs having computer-executable instructions or code running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of computer-readable medium used to actually carry out the distribution.

Figure 2A:
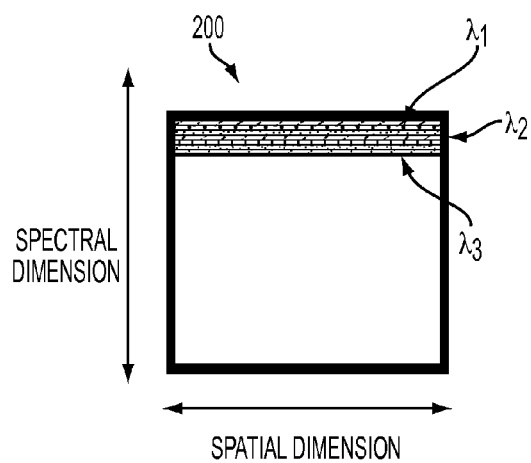
FIGS. 2A and 3A show a side view of the reflective tunable dispersive optical element for the two configurations.
Figure 3A:
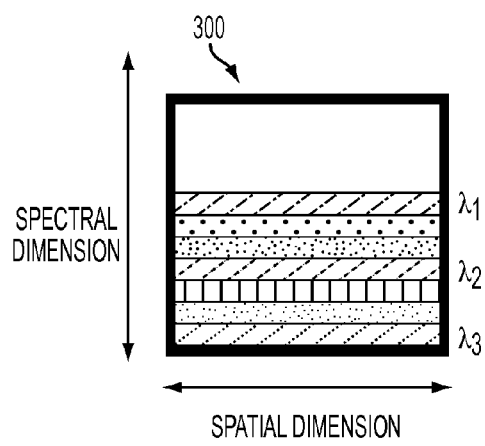
Figure 2B:
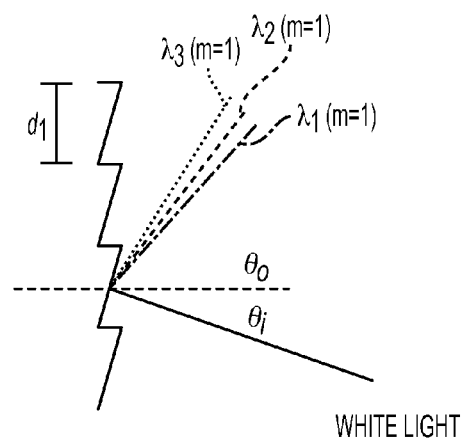
FIGS. 2B and 3B show a plan view of the electromagnetic radiation impinging on the radiation detection sensor for the two configurations.
Figure 3B:
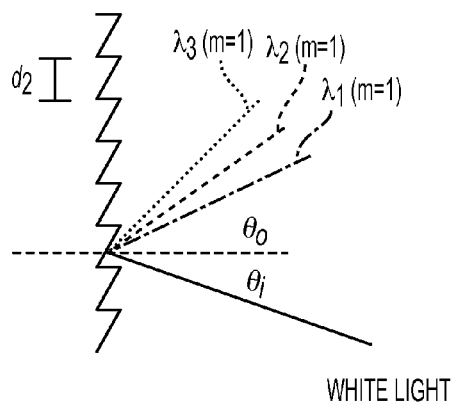

FIGS. 2-3 illustrate a schematic of a bandwidth tunable electromagnetic radiation detection device having a reflective tunable dispersive optical element in accordance with an embodiment. As shown, the tunable dispersion element may be configured as a tunable grating element whose line density can be electronically controlled, by a controller, so as to tune the dispersion of electromagnetic radiation (light) onto an electromagnetic radiation detection sensor. For the two configurations shown if FIGS. 2A and 3A, the light will fall onto the sensor in two different locations. In FIGS. 2B and 3B, the black box represents the area of the sensor. In various embodiments, the sensor could be one contiguous FPA, or be broken into multiple, separate FPAs FIG. 2A shows a side view of the reflective tunable dispersive optical element in configuration 200. Broad band or white light comprised of various wavelengths of electromagnetic radiation impinges upon the tunable reflective dispersive optical element which is configured as a reflective grating. For a diffraction grating operating in reflection, the dispersion may be characterized as follows:

$$\frac{m\lambda}{d} = \sin\theta_i + \sin\theta_o$$

where: m is the diffraction order;
$\lambda$ is a particular wavelength electromagnetic radiation;
$\theta_i$ is angle of incident electromagnetic radiation; and
$\theta_o$ is angle of diffracted electromagnetic radiation in the $m^{th}$ diffraction order.

The period of the grating in configuration 200 is $d_1$. White light impinging on the grating reflectively diffracts into constitute wavelengths $\lambda_1$, $\lambda_2$, $\lambda_3$ at the first diffraction order (m=1). Of course, it will be appreciated that other tunable dispersive optical elements may provide other known dispersion phenomenon (e.g. refraction, etc.). More particularly, when the grating period d changes, the angles of the diffraction light also change, as discussed below.

FIG. 2B shows a plan view of the dispersed electromagnetic radiation impinging upon the image sensor device. Since the diffraction of configuration 200 is small, wavelengths $\lambda_1$, $\lambda_2$, $\lambda_3$ are tightly spaced together in the spectral dimension. The spectral bandwidth or energy density of the reflected light is high, thus, providing lower spectral resolution and requiring shorter integration periods to prevent saturation of the image sensor. Saturation occurs when too many photons impinge on the sensor in a given time frame to produce an effective image.

FIG. 3A shows the same reflective tunable dispersive optical element shown in FIG. 2A, but in configuration 300. The period of the grating in configuration 300 is $d_2$ (which is smaller than $d_1$ in configuration 200). White light impinging on the grating diffracts into constitute exemplary wavelengths $\lambda_1$, $\lambda_2$, $\lambda_3$ at the first diffraction order (m=1). Due to the grating having a different period in configuration 300, the dispersion of light will be different.

FIG. 3B shows the dispersed electromagnetic radiation impinging on the image sensor. Since the dispersion (diffraction) of configuration 300 is larger, exemplary wavelengths $\lambda_1$, $\lambda_2$, $\lambda_3$ are spread out much more in the spectral dimension onto the image sensor than in configuration 200. Therefore, the spectral bandwidth or energy density is much smaller than shown in FIG. 2B, thus providing higher spectral resolution. This, however, will require longer sensor integration periods to prevent starvation of the sensor. Starvation occurs when too few photons impinge on the sensor in a given time frame to produce an effective output signal (e.g., an image).

The aforementioned embodiments effectively combine distinct multispectral and hyperspectral sensor architectures into a single tunable sensor architecture. As such, these embodiments can eliminate the need for mechanically rotated optical elements used for spectral tuning as found in conventional hyperspectral imaging architectures.

Other embodiments, uses, and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. An electromagnetic radiation detection device comprising:
   a tunable dispersive optical element configured to receive electromagnetic radiation and to change the dispersion of the received electromagnetic radiation;
   a sensor configured to detect the dispersed electromagnetic radiation changed by the dispersive optical element; and
   a controller configured to:
   (i) selectively tune the dispersive optical element so as to adjust the dispersion of the received electromagnetic radiation; and
   (ii) change one or more of operating parameters of the sensor in accordance with the adjusted dispersion.

2. The device according to claim 1, further comprising:
   a housing configured to integrate the elements therein, the housing including an opening to allow electromagnetic radiation to enter the device.

3. The device according to claim 2, wherein the opening is a pin-hole aperture such that the device is configured as a non-imager.

4. The device according to claim 2, wherein the opening is a slit such that the device is configured as an imager.

5. The device according to claim 1, wherein the tunable dispersive optical element comprises one of:
   an optical phased array (OPA);
   a microelectromechanical system (MEMS); and
   a tunable liquid crystal (LC) filter.

6. The device according to claim 1, further comprising:
   a first lens configured to collimate electromagnetic radiation entering the device that is received by the tunable dispersive optical element.

7. The device according to claim 6, further comprising:
   a second lens configured to focus the electromagnetic radiation changed by the dispersive optical element onto a focal plane, where the sensor is positioned.

8. The device according to claim 1, wherein the controller is configured to change one or more of:
   (i) the frame rate of the sensor;
   (ii) the integration period of the detected radiation from the sensor; or
   (iii) the channel of the sensor,
so as to substantially maintain the same radiometric sensitivity of the sensor to the received electromagnetic radiation for various dispersion adjustments.

9. The device according to claim 1, wherein the tunable dispersive optical element is one of a transmissive and a reflective element.

10. The device according to claim 1, wherein the tunable dispersive optical element is a grating pattern, having a tunable period.

11. The device according to claim 1, wherein the device is configured as a spectrometer to measure one or more properties of electromagnetic radiation.

12. A method for detecting electromagnetic radiation, comprising:

detecting, with a sensor, dispersed electromagnetic radiation changed by a tunable dispersive optical element configured to receive electromagnetic radiation and to change the dispersion of the received electromagnetic radiation;

adjusting the dispersive optical element so as to adjust the dispersion of the received electromagnetic radiation; and changing one or more of operating parameters of the sensor in accordance with the adjusted dispersion.

13. The method according to claim 12, wherein the tunable dispersive optical element comprises one of:

an optical phased array (OPA);

a microelectromechanical system (MEMS); and a tunable liquid crystal (LC) filter.

14. The method according to claim 12, wherein changing the one or more of operating parameters of the sensor comprises: changing one or more of:

(i) the frame rate of the sensor;

(ii) the integration period of the detected radiation from the sensor; or (iii) the channel of the sensor, so as to substantially maintain the same radiometric sensitivity of the sensor to the received electromagnetic radiation for various dispersion adjustments.

15. The method according to claim 12, further comprising: measuring one or more properties of the detected electromagnetic radiation.

16. The method according to claim 12, further comprising: detecting an image with the sensor.

\* \* \* \* \*